United States Patent [19]

Frei et al.

[11] 4,083,681
[45] Apr. 11, 1978

[54] COMPOSITIONS OF METAL COMPLEXES OF DISAZO ACID DYES STABILIZED WITH AMINO ETHERS

[75] Inventors: Alfred Frei, Thalwil; August Schweizer, Muttenz, both of Switzerland

[73] Assignee: Sandoz Ltd., Basel, Switzerland

[21] Appl. No.: 620,641

[22] Filed: Oct. 8, 1975

Related U.S. Application Data

[63] Continuation of Ser. No. 314,104, Dec. 11, 1972, abandoned, which is a continuation-in-part of Ser. No. 824,296, May 13, 1969, abandoned.

[30] Foreign Application Priority Data

| Jun. 14, 1968 | Switzerland | 8887/68 |
| Aug. 9, 1968 | Switzerland | 11971/68 |
| Feb. 7, 1969 | Switzerland | 1873/69 |
| Feb. 21, 1969 | Switzerland | 2708/69 |

[51] Int. Cl.² .................. D06P 1/655; D06P 3/32; D06P 3/60; D21H 1/46
[52] U.S. Cl. .................. 8/7; 8/13; 8/42 R; 8/42 B; 8/88; 162/162; 260/148
[58] Field of Search .......... 260/148, 247, 584 C; 8/88, 42 B, 42 R, 7, 13; 162/162

[56] References Cited

U.S. PATENT DOCUMENTS

| 2,834,773 | 5/1958 | Scalera et al. | 260/148 |
| 2,842,536 | 7/1958 | Webb et al. | 260/148 |
| 3,155,657 | 11/1964 | Bedoit | 260/247 |
| 3,397,238 | 8/1968 | Hobbs | 260/584 C |
| 3,700,653 | 10/1972 | Frei et al. | 260/148 |

FOREIGN PATENT DOCUMENTS

| 366,961 | 2/1932 | United Kingdom | 8/88 |
| 982,753 | 2/1965 | United Kingdom | 260/148 |

*Primary Examiner*—Floyd D. Higel
*Attorney, Agent, or Firm*—Gerald D. Sharkin; Richard E. Vila; Melvyn M. Kassenoff

[57] ABSTRACT

Stabilized dye compositions comprising a dye of the formula

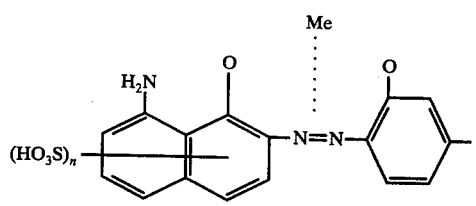

-continued

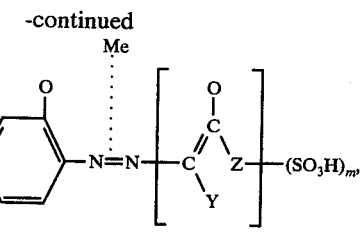

or a salt thereof,
wherein each Me is copper or nickel,
Y is optionally substituted arylcarbamoyl,
Z is lower alkyl, or
Y and Z taken together and with the carbon atoms to which they are joined form a naphthalene or heterocyclic ring,
$m$ is 1 to 3, and
$n$ is 1 or 2,
with the proviso that the sum of $m$ and $n$ is 3 to 5,
and, as a stabilizer therefor, an amino ether of the formula

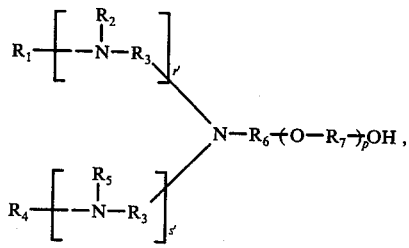

or a mixture thereof,
wherein $R_1$ is hydrogen, alkyl of 1 to 3 carbon atoms or $-R_8-O-R_9)_t\,OH$ each $R_2$ is hydrogen, alkyl of 1 to 3 carbon atoms or $-R_8-O-R_9)_{u'}\,OH$, $R_4$ is hydrogen, alkyl of 1 to 3 carbon atoms or $-R_8-O-R_9)_{v'}\,OH$, each $R_5$ is hydrogen, alkyl of 1 to 3 carbon atoms or $-R_8-O-R_9)_{w'}\,OH$, each $R_3$, $R_6$, $R_7$, $R_8$ and $R_9$ is independently alkylene of 2 or 3 carbon atoms,
$p$ is 1 to 12,
each of $r'$ and $s'$ is independently 0 to 5,
each of $t'$, $u'$, $v'$ and $w'$ is independently 0 to 13,
with the proviso that the sum of $r'$ and $s'$ is 0 to 5 and the sum of all $t'$, $u'$, $v'$ and $w'$ is 0 to 26.

9 Claims, No Drawings

COMPOSITIONS OF METAL COMPLEXES OF DISAZO ACID DYES STABILIZED WITH AMINO ETHERS

This application is a continuation of application Ser. No. 314,104, filed Dec. 11, 1972 and now abandoned, which, in turn, is a continuation-in-part of application Ser. No. 824,296, filed May 13, 1969 and now abandoned.

This invention relates to stabilized dye preparations which contain at least one dye which in the form of the free acid corresponds to the formula

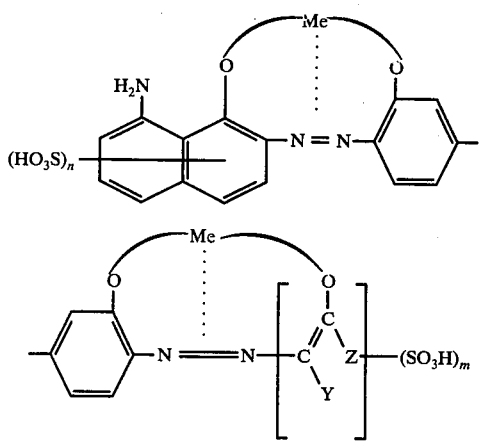

and at least one compound of the formula

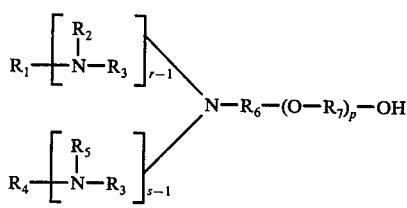

where Me stands for a copper or nickel atom,
Y for an arylaminocarbonyl radical,
Z for a lower alkyl radical, containing, e.g., 1 to 4 carbon atoms, or
Y and Z jointly for the atoms necessary for the formation of a naphthalene ring or a heterocyclic ring,
$R_1$ for hydrogen, an alkyl radical having 1 to 3 carbon atoms or a radical of the formula

$R_2$ for hydrogen, an alkyl radical having 1 to 3 carbon atoms or a radical of the formula

$R_3$ for an alkylene radical with 2 or 3 carbon atoms,
$R_4$ for hydrogen, an alkyl radical having 1 to 3 carbon atoms or a radical of the formula

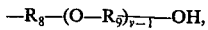

$R_5$ for hydrogen, an alkyl radical having 1 to 3 carbon atoms or a radical of the formula

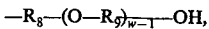

$R_6$, $R_7$, $R_8$ and $R_9$, independently of each other, for alkylene radicals having 2 or 3 carbon atoms,
$m$ for 1 to 3,
$n$ for 1 to 2,
the sum of $m$ and $n$ being 3 to 5,
$p$ for 1 to 12,
$r$ and $s$, independently of each other, each for 1 to 6, the sum of $r$ and $s$ being 2 to 7, $t$, $u$, $v$, and $w$, independently of each other, for 1 to 14, the sum of $t$, $u$, $v$ and $w$ being 4 to 30.

The content of dye of formula (I) in the stabilized preparations may vary within wide limits. Although stabilized preparations containing 1–2% by weight of of a dye of formula (I) can be produced without difficulty, it is economically preferable for them to contain at least 5% by weight of a dye of said formula. On the other hand, it is hardly possible for the preparations to contain amounts of dye in excess of 90% by weight, since the technical dyes of formula (I) invariably contain a certain proportion of salt. The stabilized dye preparations of this invention may be produced in solid or in liquid form. The solid preparations may contain 10–90 weight %, preferably 10 or 15 or more advantageously 30–85 weight % of one dye of formula (I) and 0.5–20 or preferably 0.5–10 weight % of at least one compound of formula (II).

The liquid preparations may contain 5–25 or preferably 5–15 weight % of at least one dye of formula (I), 1–20 or preferably 2–10 weight % of at least one compound of formula (II) and 45–92 or preferably 70–90 weight % of water. In addition the preparations may contain inorganic salts (NaCl, $Na_2SO_4$, $Na_2CO_3$ or the analogous potassium compounds), which originate in the production of the dyes and/or in the case of the solid preparations can be added as standardizing agents. Further, they may contain additives, including alkaline sulphates, preferably sodium lignin sulphate, alkaline phosphates, preferably sodium metaphosphate, or mixtures of such compounds; products promoting solubility, such as urea, dextrin, the alkaline metal salts of benzene-, toluene-, xylene- or naphthalene-sulphonic acids, products which precipitate or complex calcium, such as normal phosphates, condensed phosphates, salts of aminocarboxylic acids, e.g., nitrilotriacetic acid and ethylene diaminetetraacetic acid), anionic surface active compounds such as the salts of diisopropylsulphonic, dibutylnaphthalenesulphonic or dinaphthylmethanedisulphonic acid or of the alkylbenzenesulfonic acids, non-ionic surface active agents such as the water-soluble adducts of ethylene oxide on hydrophobic compounds (fatty alcohols, alkyl phenols, dialkyl phenols, fatty acid amides, etc.) or their sulphates.

The dyes of formula (I) are formed by the known method which comprises coupling 1 mole of the tetrazo compound of an amine of the formula

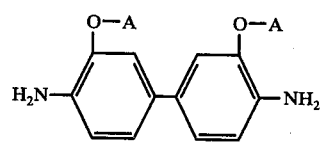

where A is hydrogen, methyl or ethyl, with 1 mole of a 1-amino-8-hydroxynaphthalene-monosulphonic or -disulphonic acid and 1 mole of a compound of the formula

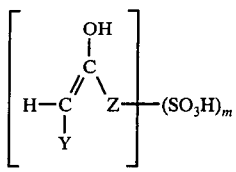
(IV),

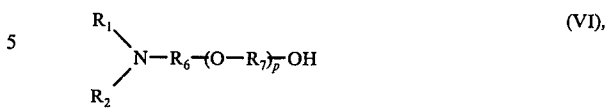

with subsequent metallization, either normal or with dealkylation.

Examples of 1-amino-8-hydroxynaphthalene-monosulphonic and -disulphonic acids are 1-amino-8-hydroxynaphthalene-4-sulphonic, -2,4-4,6- and, in particular, -3,6-disulphonic acid.

Suitable coupling components of formula (IV) include those bearing active methylene groups, such as acetoacetylaminobenzenemono- or -disulphonic acids, acetoacetylaminonaphthalenemono-, -di- or -trisulphonic acids, 1-phenyl-3-methyl- or -3-carboxy-5-pyrazolonemono- or -disulphonic acids, 1-phenyl-3-methyl-5-aminopyrazolemono- or -disulphonic acids, 1-(naphthyl-1')- or -1-(naphthyl-2')-3-methyl- or -3-carboxy-5-pyrazolonemono-, -di- or -trisulphonic acids; hydroxynaphthalenesulphonic acids, e.g. 2-hydroxynaphthalene-6- or -8-sulphonic acid, 2-hydroxynaphthalene-3,6-, -5,7- or -6,8-disulphonic acid, 2-hydroxynaphthalene-3,6,8-trisulphonic acid, 1-hydroxynaphthalene-4- or -5-sulphonic acid, 1-hydroxynaphthalene-3,6- -3,8-, -4,6- or -4,7-disulphonic acid, 1-hydroxynaphthalene-3,6,8-trisulphonic acid, aminohydroxynaphthalenesulphonic acids, e.g., 2-amino-8-hydroxynaphthalene-6-sulphonic acid, 2-amino-5-hydroxynaphthalene-7-sulphonic acid, 2-phenylamino-5-hydroxynaphthalene-7-sulphonic acid, 1-amino-8-hydroxynaphthalene-2,4-, -4,6- and, in particular, -3,6-disulphonic acid, 1-amino-8-hydroxynaphthalene-4-sulphonic acid, 1-phenylamino-8-hydroxynaphthalene-3,6-disulphonic acid, 1-acetylamino-, 1-propionylamino-, 1-ethoxycarbonylamino-, 1-methoxycarbonylamino- or 1-benzoylamino-8-hydroxynaphthalene-4,6- or -3,6-disulphonic acid. The preferred dyes of formula (I) are those for whose production the compound of formula (IV) employed is a hydroxynaphthalenesulfonic acid or an aminohydroxynaphthalenesulfonic acid which may be N-alkylated, N-arylated or N-acylated. Particularly interesting are the symmetrical copper containing dyes of formula (I) and particularly the dye which in the form of the free acid corresponds to the formula compounds of formula II, special mention may be made of those of the formula $$R_1 \atop R_2 \!\!>\!\! N-R_6-(O-R_7)_p-OH \qquad (VI),$$

where $R_1$, $R_2$, $R_6$, $R_7$ and $p$ have one of the meanings specified in the foregoing, e.g.

$H_2N-C_2H_4-O-C_2H_4-OH$;  $H_2N-C_2H_4-O-C_2H_4-O-C_2H_4-OH$, and further the reaction products of ammonia and polyethylene glycol halides of the formula $Hal-(C_2H_4-O)_x-H$, where Hal stands for a halogen atom, such as chlorine and $x$ for a number from, e.g., 4 to 12, examples being polyethylene glycol chlorides with average molecular weights of 210, 410 or 610, and the condensation products of at least 5 moles of ethylene oxide and 1 mole of ethylenediamine of at least 6 moles of ethylene oxide and 1 mole diethylenetriamine, of at least 7 moles ethylene oxide and 1 mole triethylene tetramine, or of at least 8 moles ethylene oxide and 1 mole tetraethylene pentamine.

The preferred compositions comprise the dye of formula (VIII) and an amine stabilizer of formula VI wherein $R_1$, $R_2$, $R_6$, $R_7$, $R_8$, $R_9$, $t$ and $v$ are as set forth on pages 2 and 3. A particularly preferred stabilizer is $H_2N-CH_2CH_2-O-CH_2CH_2OH$. The preferred liquid compositions of this invention contain 5 to 15% by weight of the dye of formula (VIII), 2 to 10% by weight of stabilizer and 70 to 90% by weight of water. The preferred solid compositions of this invention contain 10 to 85%, preferably 15 to 85% or 30 to 85%, by weight of the dye, 0.5 to 10% by weight of amine stabilizer and (8 to 26.5% by weight of) a standardizing agent. They also contain sodium ligninsulfate or sodium metaphosphate or a mixture thereof. Sodium lignin sulphate and/or sodium metaphosphate are advantageously used as standardizing materials. These two agents have far less effect on the good solubility and the shade stability of the dyes than the alkali metal sulphates and/or alkali metal chlorides commonly used as standardizing agents.

A choice of methods is available for producing these dye preparations. For example, the dyes of formula (I), the compounds of formula (II) and the other additives if employed can be mechanically mixed or kneaded to form pastes; these same components can be dissolved in water to form liquid preparations, or the solution of the components can be evaporated to dryness at normal or reduced pressure or atomized to form solid preparations or dyes of the formula

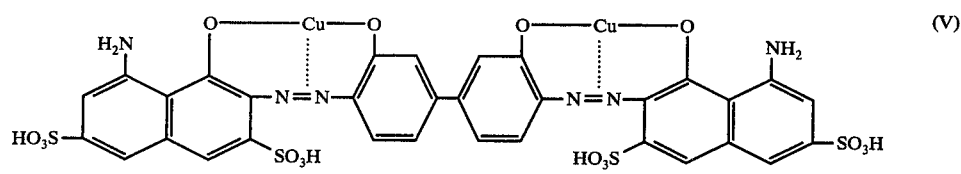
(V)

and its mono-, di-, tri- or tetraalkali metal or the corresponding ammonium salt, e.g. (Formula VIII). Of the

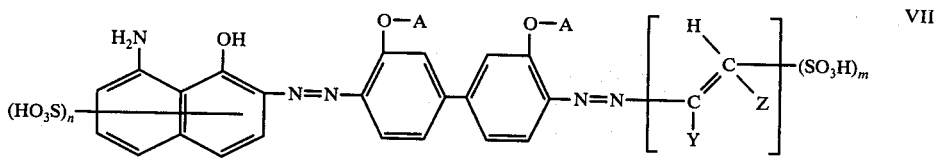

can be metallized in the presence of at least one compound of formula (II) and the product converted into a solid or liquid preparation as outlined. The preferred dye correponds to formula (V) in its tetrasodium salt form.

These dye preparations are suitable for dyeing wool, silk, polyamide and polyurethane fiber, leather and in particular, natural and regenerated cellulosic fiber. They are also applicable to paper, e.g., they may be used to produce colored paper by addition to paper stock. The dyeings have good fastness to light, washing, water, sea water, perspiration, carbonizing, bleaching, milling, rubbing, pressing, acids, alkalis, stoving and cross dyeing.

The preparations are extremely stable and can be left for a considerable length of time without the dye being decomposed by the action of light and atmospheric humidity. The preparations are, therefore, storable at room temperature for long periods; they are unaffected by frost and immune to mould growth.

In the following Examples the parts and percentages are by weight and the temperatures are in degrees centigrade.

EXAMPLE 1

The disazo dye of the formula

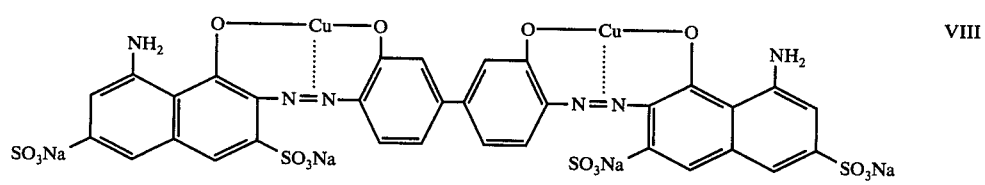

which is produced by coupling tetrazotized 4,4'-diamino-3,3'-dimethoxy-1,1'-diphenyl with 1-amino-8-hydroxynaphthalene-3,6-disulphonic acid and coppering the product with demethylation, is employed. 109 Parts of the moist filtercake of approximately 50% dry content is washed on the filter with a solution of 250 parts of sodium chloride and 40 parts of 2-amino-2'-hydroxydiethylether per liter water. After washing the weight of the filtercake is about 220 parts, which consists of about 54 parts of dye, about 24 parts of sodium chloride, about 4 parts of 2-amino-2'-hydroxydiethylether and about 83 parts of water. It is dried at 70°–80° and its stability is then tested by storing a sample for 20 days at 80° in a dry air atmosphere in an enclosed vessel. The chromatogram of the sample submitted to this accelerated ageing test shows that only small amounts of decomposition products are present. The tested sample gives a blue dyeing on paper which does not deviate appreciably in shade from that of the stabilized dye preparation not submitted to the ageing test and is of equal brightness, whereas a sample of the untreated starting dye that has been submitted to the ageing test has a chromatogram which shows a substantial proportion of grey decomposition products and it gives a redder, flatter blue dyeing on paper.

EXAMPLE 2

109 Parts of the moist filtercake of the disazo dye (VIII), which contains approximately 50% dye and 13% sodium chloride, are stirred evenly into a solution of 7 parts of 2-amino-2'-hydroxy-diethylether and 25 parts of anhydrous sodium sulphate in 150 parts of water. The resulting suspension is dried in an atomizer. The granulated or powder preparation thus obtained shows good stability similar to that produced in accordance with the procedure of Example 1.

EXAMPLE 3

The 7 parts of 2-amino-2'-hydroxy-diethylether employed in Example 2 are replaced by 6 parts of the condensation product of 1 mole of diethylenetriamine and 7 moles of ethylene oxide to give a preparation which shows good stability comparable to that of Example 1.

EXAMPLE 4

151 Parts of a salt-containing dye powder having a content of 72% of the pure dye (VIII), 5 parts of 2-amino-2'-hydroxy-diethylether and 30 parts of anhydrous sodium sulphate are homogeneously blended in a mixer. The resulting preparation shows good storage stability similar to the one produced in accordance with Example 1.

EXAMPLE 5

109 Parts of the moist filtercake of the disazo dye (VIII) containing approximately 50% dye and approximately 13% sodium chloride are mixed with 7.5 parts of 2-amino-2'-hydroxy-diethylether and 35 parts of anhydrous sodium sulphate in a kneading mill. The homogeneous mixture is dried to give a dye preparation which shows storage stability similar to that of Example 1.

EXAMPLE 6

The 7.5 parts of 2-amino-2'-hydroxy-diethylether employed in Example 5 are replaced by 5.5 parts of the reaction product of 1 mole tetraethylene pentamine and 8 moles of ethylene oxide, whereupon a preparation which has good stability comparable to that of Example 1 is obtained.

EXAMPLE 7

109 Parts of a moist filtercake of dye (VIII) containing about 50% dye and about 13% sodium chloride is suspended in a solution of 250 parts of sodium chloride and 50 parts of 2-amino-2'-hydroxydiethylether per liter of water. After filtration and drying a dye preparation which shows good results in the accelerated ageing test similar to those of the preparation prepared by the procedure of Example 1 is obtained.

EXAMPLE 8

109 Parts of the disazo dye (VIII) in the form of an aqueous salt-containing paste of about 50% dye content are stirred into 900 parts of water at 20° and brought into solution by the addition of 60 parts of 2-amino-2'-hydroxy-diethylether. The dye solution is purified by the addition of 20 parts of diatomaceous earth and filtration, or by centrifuging, and is then diluted with water to 1200 parts. The liquid dye preparation thus formed, which is of dark blue colour, is storable at room temperature for several months.

EXAMPLE 9

242 Parts of an aqueous, salt-containing dye paste with a content of 45% of the pure dye (VIII) is dissolved at about 30° in a mixture of 1000 parts of water and 70 parts of 2-amino-2'-hydroxy-diethylether. The dark blue dye solution formed is purified by centrifuging and adjusted to 1300 parts with water. This liquid dye preparation is storable at room temperature for several months.

Paper Dyeing Method A

An aqueous suspension of 100 parts of chemically bleached sulphite cellulose pulp is refined in a beater, with the addition at a suitable point of 1 part of the dye preparation specified in Example 2. The stock is sized 15 minutes later, which fixes the dye. The paper produced from this stock has a greenish blue shade of medium depth showing good fastness properties. The backwater from the paper machine is colourless.

Dyeing Method for Cellulosic Fibres B

A dyebath is prepared with 3000 parts of softened water, 2 parts of anhydrous sodium carbonate and 3 parts of the dye preparation described in Example 2. At 30° 100 parts of a wetted cotton fabric are entered into the bath, after which 10 parts of sodium sulphate are added. The bath temperature is increased to 100° in 30 minutes, with further additions of 10 parts of sodium sulphate at 50° and 70°. After dyeing for 15 minutes at 100° a final 10 parts of sodium sulphate are added. The bath is then allowed to cool and at 50° the dye cotton is removed, rinsed well with cold water and dried at 60°. A dyeing of greenish blue shade is obtained which has good light and wet fastness.

EXAMPLE 10

109 Parts of the disazo dye of formula (VIII) in the form of a salt-containing 45% aqueous paste are dissolved in a solution of 45 parts of 2-amino-2'-hydroxy-diethylether in 1250 parts of soft water at 40°. The dye solution is purified by treatment with 5 parts of diatomaceous earth followed by filtration. The deep blue liquid preparation thus obtained is storable at room temperature or at high temperatures for several months.

EXAMPLE 11

109 Parts of the disazo dye of formula (VIII) in the form of a salt-containing 45% aqueous paste are dissolved at 40° in a mixture of 1200 parts of demineralized water, 45 parts of 2-amino-2'-hydroxy-diethylether and 15 parts of sodium lignin sulphate. The solution is clarified with 5 parts of diatomaceous earth and filtered. the liquid dye preparation thus obtained is stable for several months at temperatures up to 40°.

EXAMPLE 12

125 Parts of a salt-containing dye powder with a content of 80% of the pure dye (VIII), which can be obtained by drying in an atomizer, are homogeneously blended with 546 parts of sodium lignin sulphate and 20 parts of 2-amino-2'-hydroxy-diethylether in a mechanical mixer. The resulting dye preparation has good storage stability.

EXAMPLE 13

125 Parts of a salt-containing dye powder with a content of 80% of the pure dye (VIII), 546 parts of sodium metaphosphate and 20 parts of 2-amino-2'-hydroxy-diethylether are homogeneously blended in a mixer. The resulting preparation shows good storage stability similar to that of Example 1. Preparations with similar good stability are obtained when a mixture of sodium metaphosphate and sodium lignin sulphate is employed in place of sodium metaphosphate alone.

EXAMPLE 14

A mixture of 90 parts of the disazo dye (VIII) in the form of a moist filtercake containing about 50% dye and about 10% sodium chloride, 15 parts of 2-amino-2'-hydroxy-diethylether and 177 parts of sodium metaphosphate is homogeneously blended in a kneader and dried to give a preparation showing good storage stability similar to that of Example 1.

EXAMPLE 15

The sodium metaphosphate used in Example 14 is partly or wholly replaced by sodium lignin sulfate, by which a dye preparation is obtained with good storage stability similar to that of Example 1.

EXAMPLE 16

109 Parts of the disazo dye (VIII) in the form of a moist filtercake containing about 50% dye and 10% sodium chloride are homogeneously stirred into a solution of 23 parts of 2-amino-2'-hydroxy-diethylether, 157 parts of sodium metaphosphate and 360 parts of water. The resulting mixture is dried in an atomizer to give a dye preparation which shows good stability similar to that of Example 1.

EXAMPLE 17

The 7 parts of 2-amino-2'-hydroxy-diethylether used in Example 2 are replaced by 6 parts of the product obtained by the reaction of 1 mole ethylenediamine with 12 moles of ethylene oxide at 160°–170° in the presence of 0.2% sodium hydroxide. The dye preparation obtained has good stability similar to that of Example 1.

EXAMPLE 18

The 7.5 parts of 2-amino-2'-hydroxy-diethylether employed in Example 5 are replaced by 5.5 parts of the product obtained by the reaction or 1 mole diethylenetriomine with 6 moles ethylene oxide at 80°–90°, on which a preparation is obtained having good storage stability similar to that of Example 1.

EXAMPLE 19

A stabilized dyeing preparation consists of:

| | |
|---|---|
| 52 parts | of the salt-free disazo dye in the form of the tetrasodium salt and the divalent copper complex, molecular weight 1087, as in Example 1 and corresponding to formula (VIII). |
| 18.5 parts | of anhydrous sodium sulphate, |
| 8 parts | of sodium chloride, |
| 7.5 parts | of sodium carbonate, |
| 7 parts | of 2-amino-2'-hydroxy diethylether, |
| 7 parts | of water (moisture) |
| 100 parts | |

Paper can be dyed with this preparation by the method described in Application Example A.

EXAMPLE 20

A stabilized dyeing preparation consists of:

| | |
|---|---|
| 5.8 parts | of the salt-free disazo dye in the form of the tetrasodium salt and the divalent copper complex, molecular weight 1087, as in Example 1 and corresponding to formula (VIII), |
| 3 parts | of 2-amino-2'-hydroxy diethylether, |

0.9 parts of sodium chloride,
90.3 parts of water
100 parts

Paper can be dyed with this preparation by the method described in Application Example A.

What we claim is:

1. A stable liquid dye composition comprising about 5 to 15% by weight of a dye, said dye being the compound of the formula

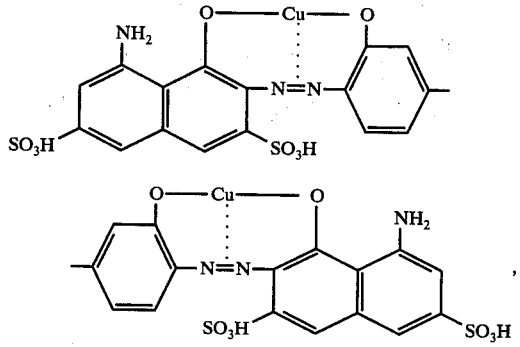

or a salt thereof,
about 2 to 10% by weight of the stabilizer of the formula $H_2N-CH_2CH_2-O-CH_2CH_2OH$, said amount of said stabilizer being effective for the stabilization of said dye, and water.

2. A stable liquid dye composition according to claim 1 comprising about 5 to 15% by weight of said dye, about 2 to 10% by weight of said stabilizer and about 70 to 90% by weight of water.

3. A stable liquid dye composition according to claim 2, wherein said dye is the compound of the formula

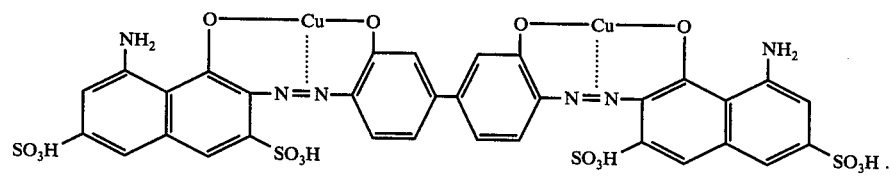

4. A stable liquid dye composition according to claim 2, wherein said dye is the compound of the formula

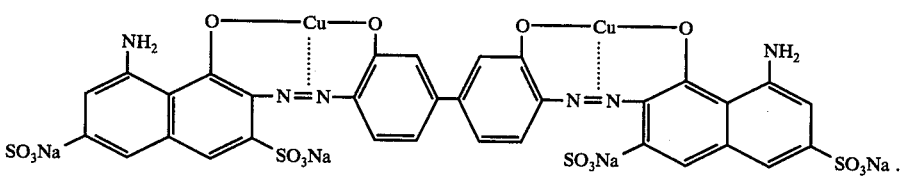

5. A stable liquid dye composition according to claim 2 consisting essentially of about 5 to 15% by weight of said dye, about 2 to 10% by weight of said stabilizer and about 70 to 90% by weight of water.

6. A stable liquid dye composition according to claim 5 wherein said dye is the compound of the formula

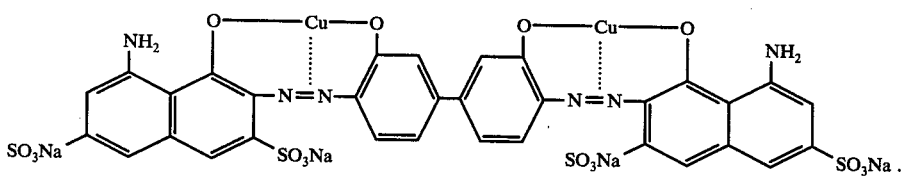

7. A stable liquid dye composition according to claim 5 consisting essentially of 5 to 15% by weight of said dye, 2 to 10% by weight of said stabilizer and 70 to 90% by weight of water.

8. A stable liquid dye composition according to claim 7 wherein said dye is the compound of the formula

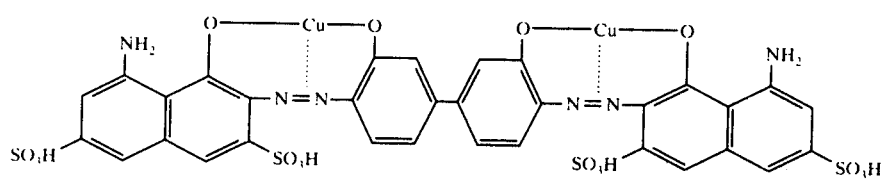
9. A stable liquid dye composition according to claim 7 wherein said dye is the compound of the formula
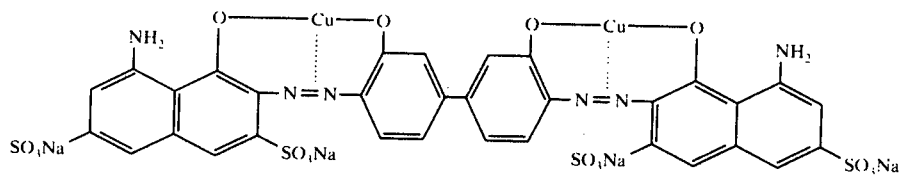
* * * * *